United States Patent
Cook

(10) Patent No.: US 9,678,701 B2
(45) Date of Patent: Jun. 13, 2017

(54) HANDHELD MEASURING DEVICE COMPRISING A USER INTERFACE RESPONSIVE TO CHANGES IN A DISPLACEMENT SENSED BY A DISPLACEMENT SENSOR

(71) Applicant: Mitutoyo Corporation, Kanagawa-ken (JP)

(72) Inventor: Ted Staton Cook, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 290 days.

(21) Appl. No.: 14/533,978

(22) Filed: Nov. 5, 2014

(65) Prior Publication Data

US 2016/0123712 A1    May 5, 2016

(51) Int. Cl.
*G01B 3/20* (2006.01)
*G06F 3/14* (2006.01)

(52) U.S. Cl.
CPC .............. *G06F 3/14* (2013.01); *G01B 3/205* (2013.01)

(58) Field of Classification Search
CPC ... G01B 5/14; G01B 5/00; G01B 5/12; G01B 3/00; G01B 3/002
USPC .......... 33/819, 549, 783, 784, 792, 794, 706
See application file for complete search history.

(56) References Cited

U.S. PATENT DOCUMENTS

| | | | |
|---|---|---|---|
| 4,879,508 A | 11/1989 | Andermo | |
| 4,973,957 A | 11/1990 | Shimizu et al. | |
| 5,023,559 A | 6/1991 | Andermo | |
| 5,495,677 A * | 3/1996 | Tachikake | G01B 3/18 33/784 |
| 5,574,381 A | 11/1996 | Andermo et al. | |
| 5,841,274 A | 11/1998 | Masreliez et al. | |
| 5,886,519 A | 3/1999 | Masreliez et al. | |
| 5,894,678 A | 4/1999 | Masreliez et al. | |
| 5,973,494 A | 10/1999 | Masreliez et al. | |
| 6,002,250 A | 12/1999 | Masreliez et al. | |
| 6,011,389 A | 1/2000 | Masreliez et al. | |
| 6,247,244 B1 * | 6/2001 | Zanier | G01B 3/18 33/784 |
| RE37,490 E | 1/2002 | Andermo et al. | |
| 7,246,032 B2 * | 7/2007 | Feldman | G01B 3/205 702/158 |
| 8,745,108 B2 | 6/2014 | Jansson | |

(Continued)

*Primary Examiner* — Yaritza Guadalupe-McCall
(74) *Attorney, Agent, or Firm* — Seed Intellectual Property Law Group LLP

(57) ABSTRACT

A measuring device is provided including a user interface responsive to changes in a displacement sensed by a displacement sensor. The measuring device (e.g., a handheld caliper or micrometer) includes a displacement sensor, a display, a signal processing and control portion, and a user interface. The displacement sensor includes a readhead and a scale displaceable relative to one another along a measuring axis under the manual control of a user, with the display being connected to the readhead. In a first user interface mode, displacement measurement values are displayed and are responsive to changes in the displacement of the displacement sensor. In a second user interface mode, operation control elements are displayed in the user interface and an operation control element action visible in the user interface (e.g., movement of a selection indicator) is responsive to changes in the displacement of the displacement sensor.

20 Claims, 11 Drawing Sheets

(56) References Cited

U.S. PATENT DOCUMENTS

| | | | | |
|---|---|---|---|---|
| 2006/0106568 A1* | 5/2006 | Feldman | ................ | G01B 3/205 |
| | | | | 702/158 |
| 2009/0282689 A1* | 11/2009 | Hayashida | ............... | G01B 3/18 |
| | | | | 33/819 |
| 2015/0219431 A1* | 8/2015 | Jordil | ................... | G01B 21/047 |
| | | | | 33/701 |
| 2016/0123712 A1* | 5/2016 | Cook | ........................ | G06F 3/14 |
| | | | | 33/819 |

* cited by examiner

HANDHELD MEASURING DEVICE COMPRISING A USER INTERFACE RESPONSIVE TO CHANGES IN A DISPLACEMENT SENSED BY A DISPLACEMENT SENSOR

BACKGROUND

Technical Field

The invention relates generally to measuring devices such as electronic calipers, micrometers, and similar length and angle measuring devices.

Description of the Related Art

Various handheld measuring devices are currently available. One example of such a handheld measuring device is a displacement measuring instrument, such as an electronic caliper which can be used for making precise measurements of physical dimensions of objects (e.g., measuring machined parts to ensure that they are meeting tolerance requirements). Exemplary electronic calipers are disclosed in commonly assigned U.S. Pat. Nos. RE37490, 5,574,381, 5,973,494 and 8,745,108, each of which is hereby incorporated by reference in its entirety.

Such measuring devices, particularly in the case of commercially-available electronic calipers and micrometers, have become near-commodities. Elements such as the user-controlled functions, the number and spacing of the buttons to activate the functions, and the dimensions of the electronic housing and the display have settled into a narrow range of configurations. These configurations provide the manufacturability, economical, functionality, and ergonomic factors that are expected or required by a majority of manufacturers and users of such devices. As such, manufacturers and users are reluctant to accept design variations that may have undesirable effects, such as increasing the number of buttons or decreasing their ergonomic spacing, increasing the ergonomic dimensions of the electronic housing, etc., even to a moderate extent. Some commercial attempts to offer a button-controlled menu have proven tedious to operate (due to the many pushes required) and/or introduced concerns regarding button life. Touch screens used to solve similar problems in phones may be undesirable from a cost or reliability standpoint for some market segments. It would be desirable to provide additional functions that can be controlled by a user, provided that those functions can be quickly accessed in an intuitive manner without significantly affecting the device size, mechanical complexity, or cost.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A measuring device is provided including a user interface responsive to changes in a displacement sensed by a displacement sensor. In various implementations, the measuring device (e.g., a handheld caliper or micrometer) includes a displacement sensor, a display, a signal processing and control portion, and a user interface. The displacement sensor includes a readhead and a scale displaceable relative to one another along a measuring axis under the manual control of a user, with the display being connected to the readhead. The signal processing and control portion is connected to the displacement sensor and the display. The user interface is controlled by the signal processing and control portion and is displayed on the display, including user interface features comprising displacement measurement values and operation control elements.

In various implementations, the user interface may include a first user interface mode and a second user interface mode. In the first user interface mode, the displacement measurement values are displayed and are responsive to changes in the displacement of the displacement sensor. In the second user interface mode, the operation control elements are displayed in the user interface and an operation control element action visible in the user interface is responsive to changes in the displacement of the displacement sensor.

In various implementations, the operation control elements may include, for example, one or more user interface screens, and/or operation identifiers and/or item identifiers (e.g., identifiers on a user interface screen). A respective user interface screen may include a respective screen configuration. Operation identifiers may include a plurality of operation identifiers in an operation selection menu. Item identifiers may include a plurality of item identifiers in an item selection menu.

In various implementations, the operation control element action may include a selection action which selects an operation control element. The selection action may include at least one of selecting, or switching between, respective user interface screens which include respective screen configurations; selecting an operation identifier in an operation selection menu; or selecting an item identifier in an item selection menu. As one example, a selection of an operation identifier may include moving a selection indicator between operation identifiers within the operation selection menu in response to a change in the displacement of the displacement sensor. In various implementations, the user interface may further include a selection activation element (e.g., a button) operable by a user to activate operations associated with the operation control element selected by the selection action.

In various implementations, the measuring device may be a handheld caliper and moving the selection indicator may include moving it from a first operation identifier to a second operation identifier in response to a change in the displacement of the displacement sensor. In various implementations, the user interface may further include one or more buttons that are manually operable by a user to switch between the first and second user interface mode. In various implementations, the operation control element action that is visible in the user interface that is responsive to changes in the displacement of the displacement sensor includes a user interface navigation action that moves a user interface focus between a plurality of operation control elements included in the user interface.

DETAILED DESCRIPTION

Figure 1:
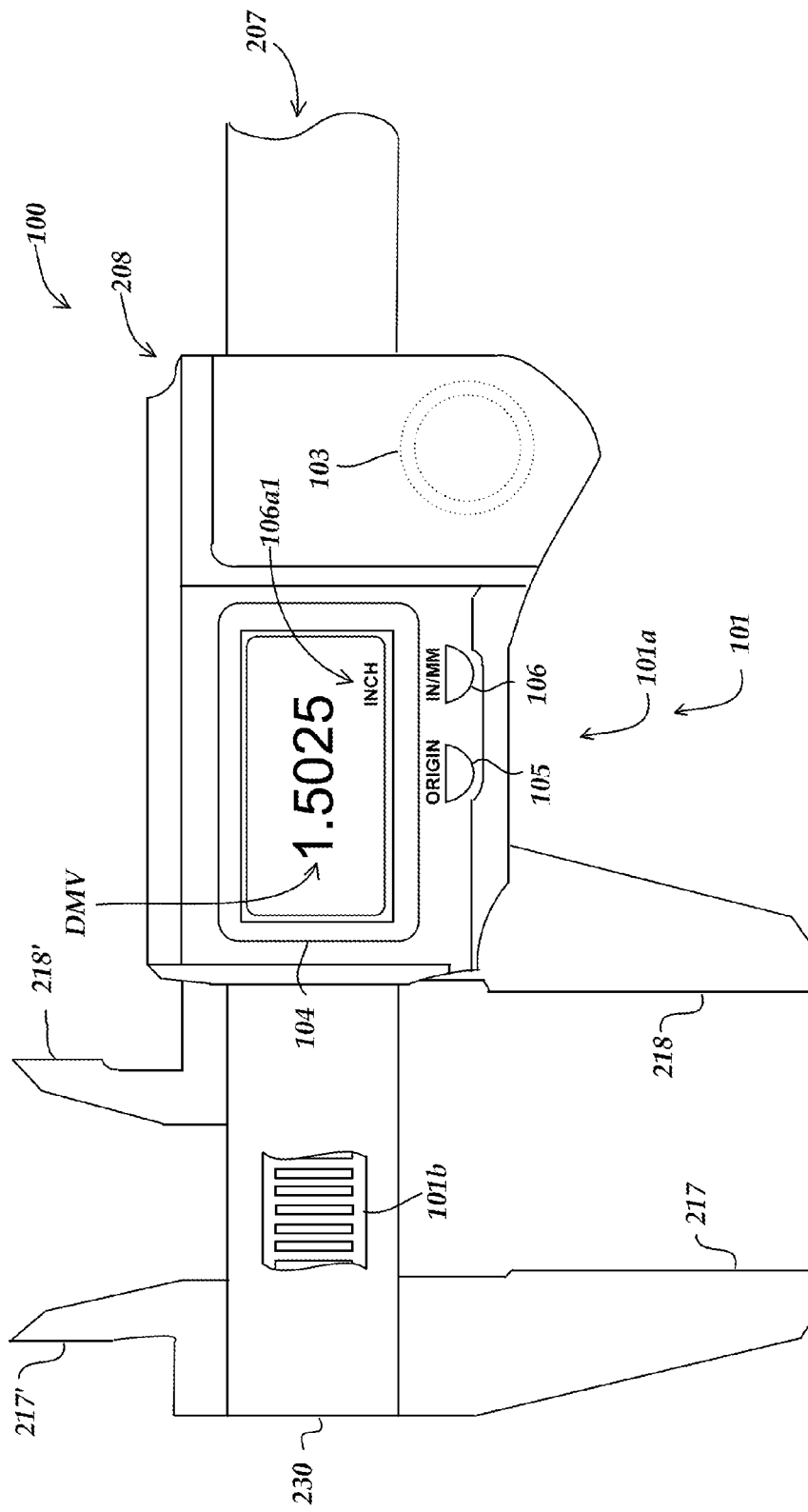
FIG. 1 is a diagram of a prior art measuring device.

FIG. 1 is a diagram of a portion of a prior art measuring device 100. A similar prior art measuring device with some of the same features as the measuring device 100 is described in more detail in U.S. Pat. No. 8,745,108, which is hereby incorporated by reference herein in its entirety. As shown in FIG. 1, the measuring device 100 includes a displacement sensor 101 with a readhead 101a and a scale 101b. The scale 101b is carried on a scale member 207 which may be a conventional electronic caliper scale member comprising jaw portions 217 and 217' and a spar portion 230. A portion of the scale 101b is revealed in FIG. 1 as carried on the spar portion 230. The readhead 101a is carried on a readhead member 208 which may be a conventional electronic caliper readhead member including jaw portions 218 and 218', and a guide and mounting portion (not shown) that aligns and guides the readhead member 208 along the spar portion 230.

In the embodiment shown in FIG. 1, the readhead member 208 includes a display 104, a power supply 103 (located internally and shown in dashed outline), and buttons 105 and 106. In accordance with conventional calipers, the button 105 may be for setting an "origin" for a measurement, and the button 106 may be for selecting a measurement unit of "in/mm", as displayed as a measurement unit indicator 106a1 on the display 104. The measurement unit indicator 106a1 is capable of displaying conventional measurement unit indicators such as "inch" and "mm," which indicate units of inches and millimeters, respectively.

During measurement operations, as is known for conventional calipers, the readhead member 208 is moved so that the measurement jaw 218 or 218' is in contact with a target portion of a workpiece WP together with the measurement jaw 217 or 217'. At this time, the displacement of the readhead 101a relative to the scale 101b is detected as a measurement signal by a signal processing and control portion (not shown) on the readhead member 208. The detected measurement signal is processed and displayed as a displayed measurement value DMV on the display 104 (e.g., 1.5025 inches in the example of FIG. 1).

Figure 2:
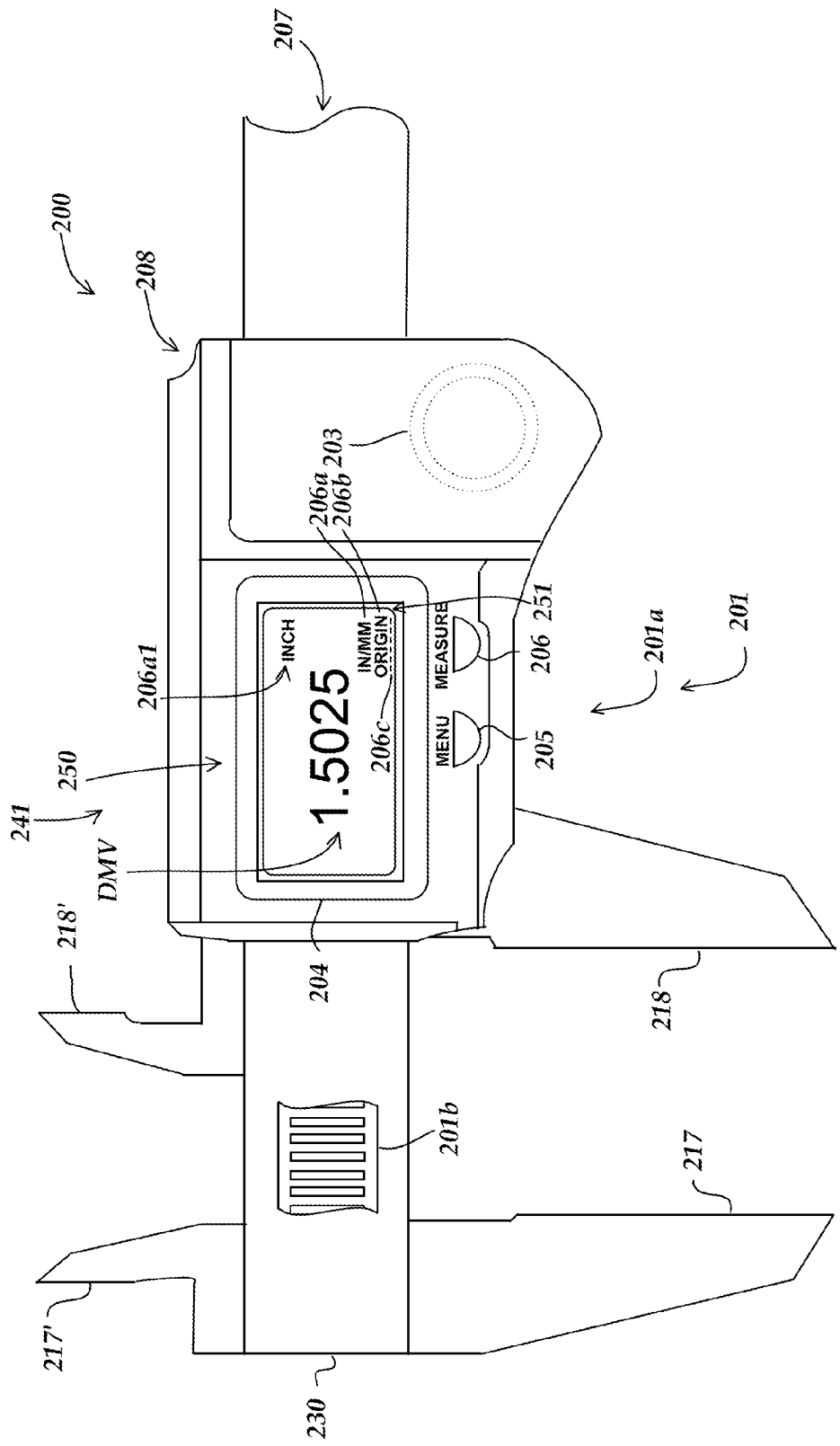
FIG. 2 is a diagram of a measuring device with a displacement sensor and a display illustrating a first exemplary embodiment of a first user interface mode.

FIG. 2 is a diagram of a measuring device 200 with a display 204 including a user interface 250 illustrating a first exemplary embodiment of a first user interface mode 241. It will be appreciated that certain components of the measuring device 200 may be similar to those of the measuring device 100 of FIG. 1, and will be understood to operate similarly, except as otherwise described below. In various implementations, the measuring device 200 may be a compact portable measuring device, such as a handheld caliper. As shown in FIG. 2, the measuring device 200 includes a displacement sensor 201 with a readhead 201a and a scale 201b displaceable relative to one another along a measuring axis under a manual control of a user, with the display 204 being connected to the readhead 201a. The readhead 201a is carried on a readhead member 208 including jaw portions 218 and 218', and the scale 201b is carried on a scale member 207 with jaw portions 217 and 217' and a spar portion 230. As will be described in more detail below with respect to FIG. 6, a signal processing and control portion is connected to the displacement sensor 201 and the display 204, wherein the user interface 250 is controlled by the signal processing and control portion. A power supply 203 (e.g., located internally and shown in dashed outline) is provided for powering the measuring device 200.

As will be described in more detail below, in various implementations the user interface 250 may include a first user interface mode and a second user interface mode. In the first user interface mode (e.g., as illustrated in FIG. 2), displacement measurement values DMV may be displayed and are responsive to changes in the displacement of the displacement sensor 201. In the second user interface mode (e.g., as will be described in more detail below with respect to FIG. 3), operation control elements are displayed in the user interface 250 and an operation control element action (e.g., as affecting the position of a selection indicator visible in the user interface 250) is responsive to changes in the displacement of the displacement sensor 201.

As shown in FIG. 2, in the first user interface mode 241 the user interface 250 includes a user interface screen 251 with a displayed measurement value DMV, button action indicators 206a and 206b, an extended button indicator 206c, and a measurement unit indicator 206a1. While the measuring device 200 is in the first user interface mode 241, the button 206 may be manually operable by a user to activate the operations associated with the button action indicators 206a and 206b. In the example of FIG. 2, a typical short press and release (e.g., less than one second) of the button 206 corresponds to the button action indicator 206a, which performs a toggle between displayed measurement units of inches or millimeters (i.e., in/mm), similar to the function of the button 106 of FIG. 1. As shown in FIG. 2, a measurement unit indicator 206a1 indicates the selected measurement unit (e.g., "inch"). The button action indicator 206b corresponds to an extended press and hold of the button 206 (e.g., longer than 1 second), which in one implementation corresponds to a standard caliper "origin" function (e.g., for setting the current caliper jaw location as "0") for a subsequent measurement operation, similar to the function of the button 105 of FIG. 1. The extended button indicator 206c (e.g., shown as a dashed underline of the "origin" label of the button action indicator 206b), indicates that the action is achieved by an extended press and hold (e.g., longer than one second) of the button 206.

While in the first user interface mode 241, the displayed measurement value DMV is responsive to changes in the displacement of the displacement sensor 201 (i.e., changes in the displacement of the readhead 201a relative to the scale 201b), similar to the operation of the measuring device 100 as described above with respect to FIG. 1. As will be described in more detail below, in various implementations the buttons 205 and 206 may be utilized to implement switching between the first and second user interface modes. For the switching between the first and second user interface modes, as will be described in more detail below with respect to FIG. 3, the button 205 (i.e., labeled "menu") may be manually operable by a user to switch to the second user interface mode when the measuring device is in the first user interface mode 241. The button 206 (i.e., labeled "measure") may be manually operable by a user to switch to the first user interface mode 241 when the measuring device is in the second user interface mode.

Figure 3:
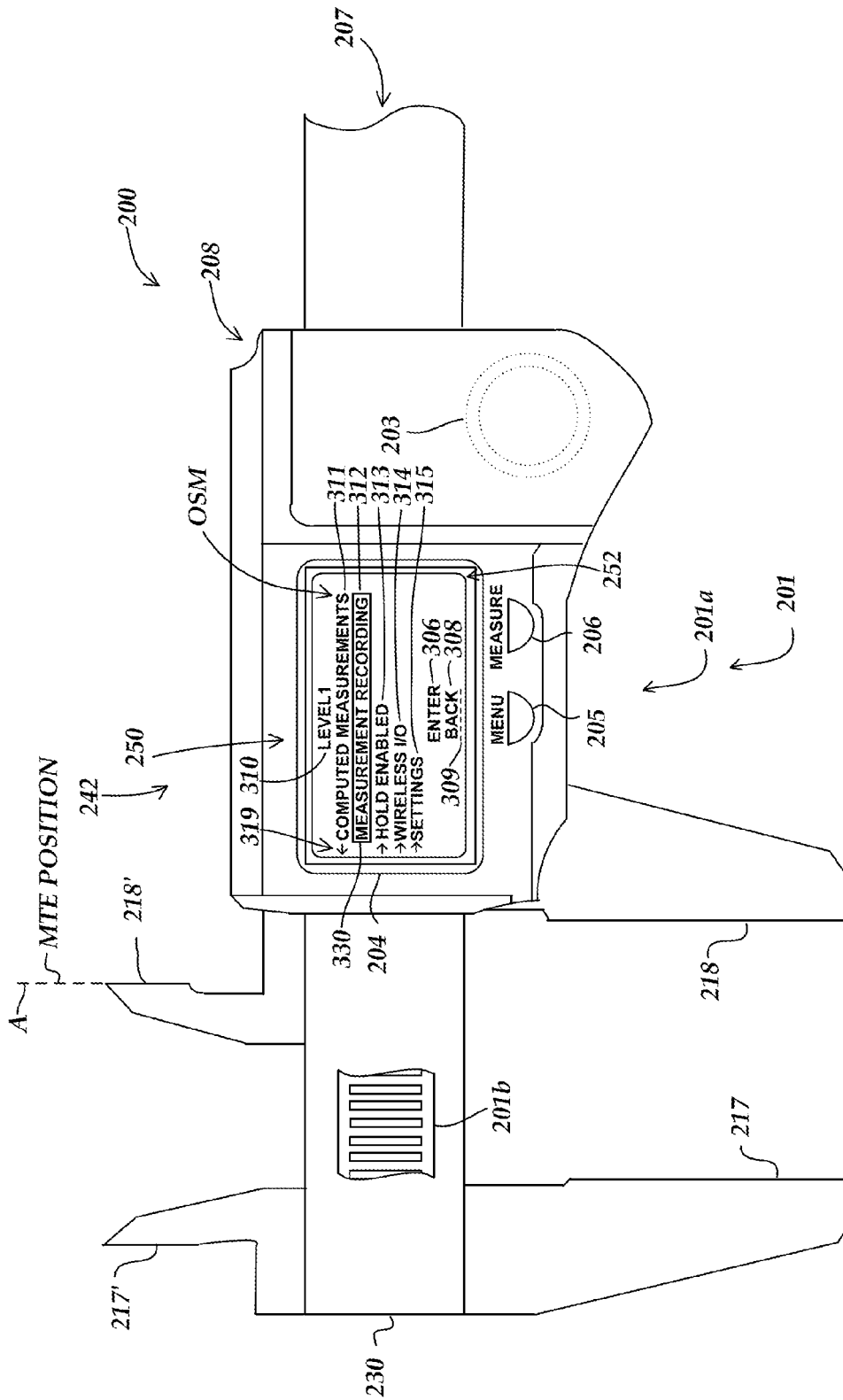
FIG. 3 is a diagram of the measuring device of FIG. 2 in which the display illustrates a first exemplary embodiment of a second user interface mode.

FIG. 3 is a diagram of the handheld measuring device 200 of FIG. 2 in which the display 204 illustrates a first exemplary embodiment of a second user interface mode 242. As described above, in one implementation the button 205 may be operable by a user to switch from the first user interface mode 241 of FIG. 2 to the second user interface mode 242 of FIG. 3. As shown in FIG. 3, in the second user interface mode 242 the user interface 250 includes a user interface screen 252 with a level indicator 310, operation identifiers 311-315 in an operation selection menu OSM, button action indicators 306 and 308, an extended button indicator 309, a directional indicator column 319, and a selection indicator 330.

In one implementation, the display 204 of the handheld measuring device 200 may include an addressable pixel array that is controlled to form displayed operation control elements (e.g., the operation identifiers 311-315), as well as the indicator elements 306, 308, 309, 310 and 330. In an alternative implementation, as will be described in more detail below with respect to FIG. 10, the display may include an LCD display comprising a fixed set of pre-fabricated operation control element patterns that form the displayed operation control elements and/or indicator elements. In one implementation, the display 204 may be of a type that is not touch sensitive.

In various implementations, the illustrated operation identifiers 311-315 may more generally be referenced as types of operation control elements. In other implementations, as will be described in more detail below, other types of operation control elements may include respective user interface screens, item identifiers, etc. Each of the operation identifiers 311-315 corresponds to a label which is indicative of the functions of the particular operation identifier. For example, the operation identifier 311 corresponds to a "computed measurements" label, which is related to an operation for performing a calculation based on a current measurement value. As specific examples, in various implementations computed measurement operations may include radius measurement operations, area measurement operations, etc.

The operation identifier 312 corresponds to a "measurement recording" label, which is indicative of operations that store a plurality of measurement values in the measuring device. It will be appreciated that traditional calipers typically do not have an ability to store or navigate through a plurality of measurement values. In various implementations, storing a plurality of measurement values also enables performing additional processing on the plurality of measurement values (e.g., determining an "average" of the stored values, etc.).

The operation identifier 313 corresponds to a "hold enabled" label, which is indicative of operations for implementing a hold function activated by a user, which may "freeze" a current measurement value on a display and/or may otherwise involve recalling or displaying one or more measurement values stored in the measuring device as a result of the hold function. The operation identifier 314 corresponds to a "wireless I/O" label which is indicative of operations that include activating wireless data transmission or reception for the measuring device. The operation identifier 315 corresponds to a "settings" label, which is indicative of operations that include altering default settings that govern operation of the measuring device 200.

In the example of FIG. 3, the selection indicator 330 (e.g., illustrated as a box) is shown in its current location as corresponding to a selection of the operation identifier 312 (i.e., for "measurement recording"). As will be described in more detail below with respect to FIG. 4, a subsequent change in the displacement of the displacement sensor 201 (e.g., a movement of the readhead 201a relative to the scale 201b) may cause a movement of the selection indicator 330 for a selection of a different operation identifier. It will be noted that in the example of FIG. 3, the position of the readhead 201a may be referenced in accordance with the position of the jaw portion 218', which is shown to be in an initial position A. As will be described in more detail below with respect to FIG. 4, the initial position A may be designated as a "mode two entry" position (i.e., an "MTE" position) which in one example may correspond to the position of the readhead 201a when the second user interface mode is entered and/or when certain other functions are initiated (e.g., as will be described in more detail below with respect to FIG. 9). As will also be described in more detail below with respect to FIG. 4, the direction that a user may move the readhead 201a relative to the scale 201b in order to move the selection indicator 330 to a given operation identifier 311-315 may be indicated by arrow symbols in the directional indicator column 319, in some embodiments.

While the measuring device 200 is in the second user interface mode 242, the button 205 may be manually operable by a user to activate the operations associated with the button action indicators 306 and 308. In the example of FIG. 3, a typical short press and release (e.g., less than one second) of the button 205 corresponds to the button action indicator 306, which corresponds to an "enter" function (e.g., as a selection action for activating an operation identifier currently indicated by the selection indicator 330). The button action indicator 308 corresponds to an extended press and hold of the button 205 (e.g., longer than 1 second), which implements a "back" function (e.g., to allow a user to return to a previous menu level, user interface screen, etc.). The extended button indicator 309 (e.g., shown as a dashed underline of the "back" label of the button action indicator 308), indicates that the action is achieved by an extended press and hold (e.g., longer than one second) of the button 205.

It will be appreciated that in various implementations, rather than a press of the button 205, a selection action may also or alternatively be implemented by other types of activation inputs (e.g., a shaking of the handheld measuring device, a tap of the handheld measuring device, a jitter of the displacement sensed by the displacement sensor, etc.). In various implementations, a selection action may also or alternatively be utilized for switching between various other predetermined types of alternatives (e.g., switching between alphanumeric inputs for a user interface input, varying a numerical value for a user interface input, etc.). In various implementations, the second user interface mode may also or alternatively include at least one particular operation control element action visible in the user interface that is triggered by or responsive to a predetermined particular speed, displacement distance, displacement end position, or pattern of positive and negative displacements, indicated by the changes in the displacement of the displacement sensor 201.

Figure 4:
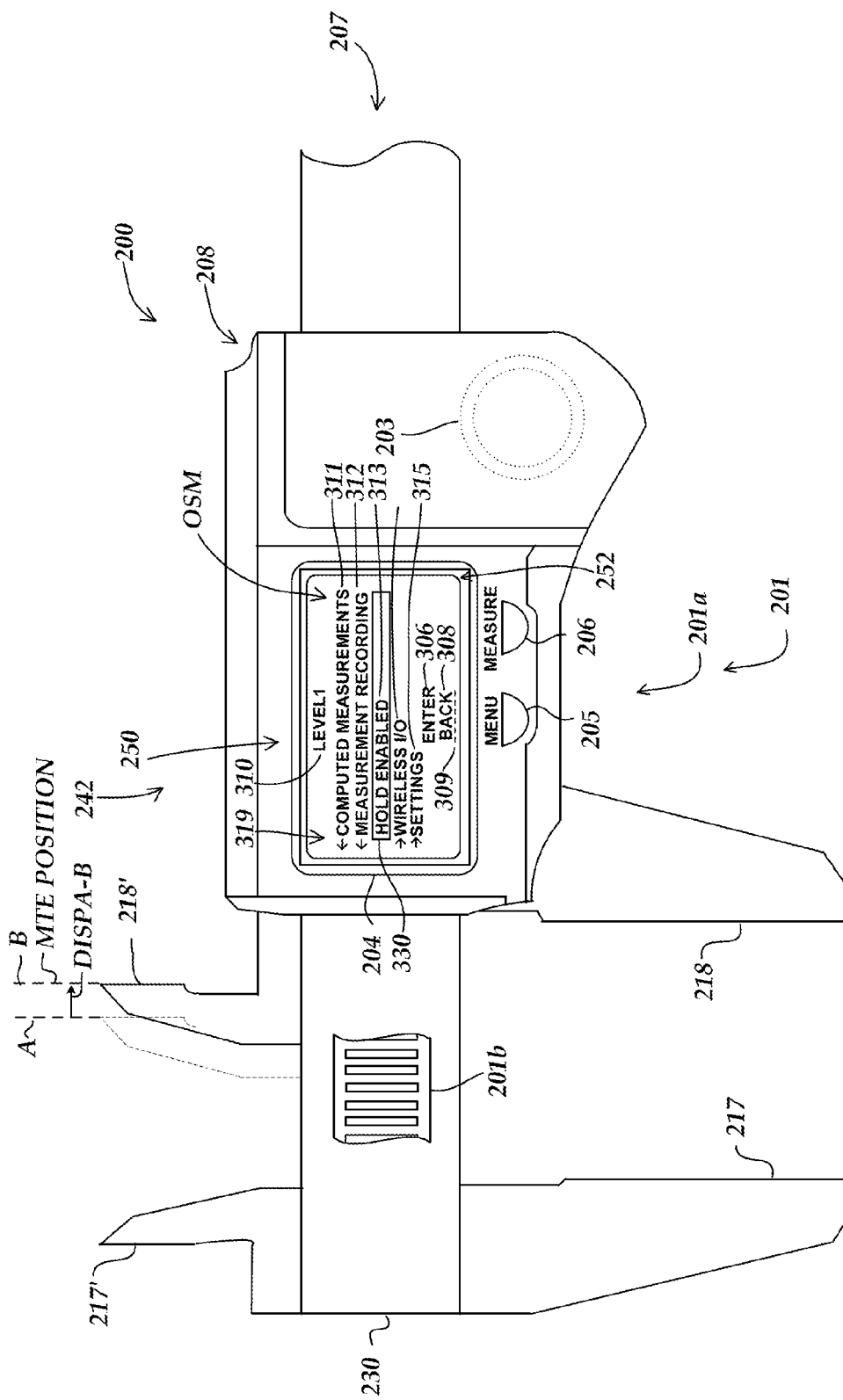
FIG. 4 is a diagram of the measuring device of FIG. 3 in which the display illustrates a subsequent movement of a selection indicator to a next operation identifier in response to a movement of the displacement sensor.

FIG. 4 is a diagram of the handheld measuring device 200 of FIG. 3 in which the user interface 250 illustrates a subsequent movement of the selection indicator 330 in response to a movement of the displacement sensor 201. As shown in FIG. 4, the movement of the readhead 201a of the displacement sensor 201 is referenced in accordance with a position of the jaw 218' (it will be appreciated that the other components of the readhead member 208 also correspondingly move, although for purposes of simplicity of the illustration, only the previous location of the jaw 218' is indicated.) The jaw 218' is illustrated as having moved from an initial MTE position ("MTE POSITION" in the figure) at a position A (i.e., corresponding to the position in FIG. 3) to a position B in FIG. 4, for a total displacement DISPA-B. The movement of the readhead 201a relative to the scale 201b is sensed by a signal processing and control portion, as will be described in more detail below with respect to FIG. 6. In response to the sensed movement of the readhead 201a, the selection indicator 330 is correspondingly moved from the operation identifier 312 (i.e., from the position of FIG. 3) to the operation identifier 313 (i.e., the position of FIG. 4).

In various implementations, the change in the displacement of the displacement sensor 201 (e.g., the movement of the readhead 201a relative to the scale 201b) which causes the movement of the selection indicator 330 from one operation identifier to another may be within a specified range (e.g., 0.5 mm to 5 mm). In the example of FIG. 4, the distance DISPA-B may fall within this range and may in various implementations be referenced as equaling or exceeding one "display changing increment." It will be noted that the direction of the movement also corresponds to the direction of the arrow symbol in the directional indicator column 319 of FIG. 3 for moving the selection indicator 330 to the operation identifier 313. For other measuring devices, other types of movements may similarly be sensed and utilized. For example, in one alternative implementation, the measuring device may be a handheld micrometer actuated by a rotating thimble, and moving the selection indicator may include moving it from a first operation identifier to a second operation identifier in response to a change in the displacement of the displacement sensor. In some such implementations, the change in the displacement which causes the movement of the selection indicator may correspond to an ergonomically favorable thimble rotation which is not less than 10 degrees and which is at most 100 degrees.

In various implementations, the actions for selecting an operation identifier as illustrated in FIGS. 3 and 4 may generally be referred to as a type of operation control element action that includes a selection action which selects an operation control element. Such selection actions may include various types of actions, such as selecting, or switching between, respective user interface screens which include respective screen configurations (e.g., as will be described in more detail below with respect to FIGS. 7-9); selecting an operation identifier in an operation selection menu (e.g., as described above with respect to FIGS. 3 and 4); selecting an item identifier in an item selection menu (e.g., selecting a measurement value from a list of recorded measurements); etc.

As described above, in the specific example of FIGS. 3 and 4, the selection of an operation identifier may include the movement of the selection indicator 330 between operation identifiers (e.g., from operation identifier 312 to 313) within the operation selection menu OSM in response to a change in the displacement of the displacement sensor 201. It will be appreciated that the movement of the selection indictor 330 may also generally be considered to be a type of user interface navigation action that moves a user interface focus (e.g., corresponding to the selection indicator 330) between operation control elements (e.g., the operation identifiers 311-315). As will be described in more detail below with respect to FIG. 5, the user interface 250 may further include a selection activation element (e.g., button 205) operable by a user to activate operations associated with the operation control element selected by the selection action.

Figure 5:
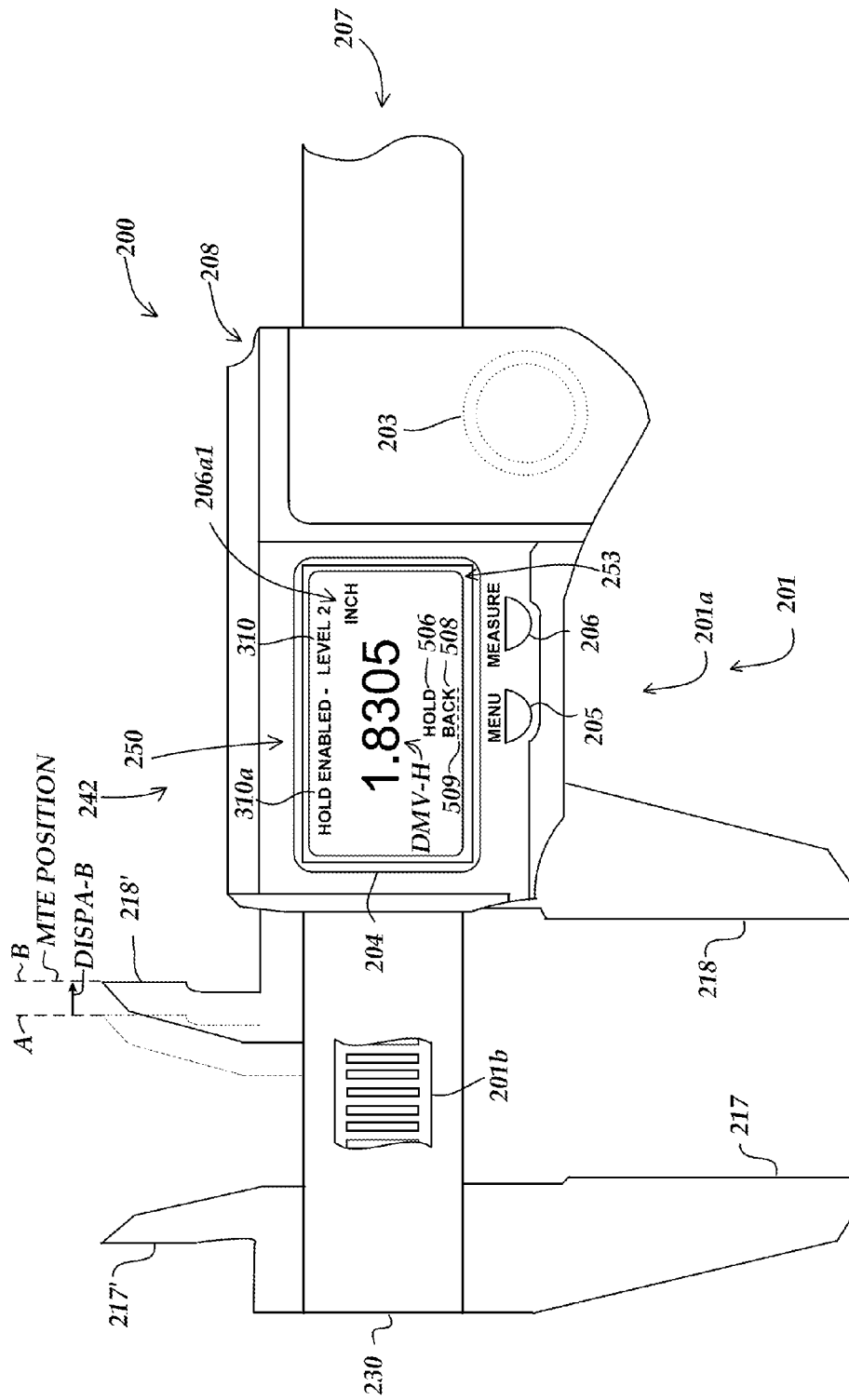
FIG. 5 is a diagram of the measuring device of FIG. 4 in which the display illustrates a subsequent activation of the selected operation identifier in response to an operation of an activation element.

FIG. 5 is a diagram of the handheld measuring device 200 of FIG. 4 in which the user interface 250 illustrates a subsequent activation of the selected operation identifier 313. The activation of the operation identifier 313 (i.e., for "hold enabled" operations) is achieved by a user having pressed the button 205 (i.e., for performing an "enter" action corresponding to the button action indicator 306) while the operation identifier 313 is within the selection indicator 330 (i.e., as illustrated in FIG. 4). As shown in FIG. 5, the user interface 250 includes a user interface screen 253 with a level indicator 310, an operation indicator 310a, a displayed measurement value DMV-H, a measurement unit indicator 206a1, button action indicators 506 and 508, and an extended button indicator 509.

The level indicator 310 is shown to indicate a "Level 2" (e.g., corresponding to a second level of a menu tree that is reached after an activation of an operation identifier from the menu tree "Level 1" of FIGS. 3 and 4). The level indicator 310 is accompanied by the operation indicator 310a, which indicates a current activation of a "hold enabled" operation (i.e., corresponding to the selected operation identifier 313 from FIG. 4). As will be described in more detail below, in accordance with the hold enabled operation, the measuring device 200 allows a user to move the readhead 201a relative to the scale 201b for measuring a dimension of a workpiece (i.e., similar to the operation described above with respect to FIG. 2), but also enables the user to press the button 205 to execute a "hold" function.

As shown in FIG. 5, the button action indicators 506 and 508 correspond to "hold" and "back" actions, respectively. For the button action indicator 506, a user presses the button 205 (e.g., for one second or less) in order to activate the hold function, which will cause in one exemplary embodiment the displayed measurement value DVM-H (i.e., 1.8305 in the current state of FIG. 5) to be "frozen" in the user interface 250, or otherwise stored, despite additional subsequent movement of the readhead 201a relative to the scale 201b. Such hold functions may be utilized for various purposes, as is known in the art. It will be appreciated that the displayed measurement value DMV-H in FIG. 5 (i.e., 1.8305) is different than the displayed measurement value DMV in FIG. 2 (i.e., 1.5025), as corresponding to the displacement DISPA-B for the movement of the readhead 201a. The displayed measurement value DMV-H indicates that at the position B the current measured distance between the surfaces of the jaws 217 and 218 (or between the surfaces of the jaws 217' and 218') is 1.8305 inches. As noted above, in the state of FIG. 5, further movement of the readhead 201a relative to the scale 201b will cause corresponding changes to the displayed measurement value DMV-H, until the hold function (e.g., corresponding to the button action indicator 506) is activated.

The button action indicator 508, along with the extended button indicator 509, indicates that a user may activate a "back" action through an extended press and hold (e.g., more than one second) of the button 205 (e.g., for returning to a previous state, such as the menu tree "Level 1" of FIG. 4). In various implementations, the "back" function may return to a previous user interface screen or state regardless of movements of the readhead 201*a* relative to the scale 201*b* during a current state. In other words, in the specific example of FIG. 5, even though subsequent movements of the readhead 201*a* may have moved the jaw 218' from the position B and thus changed the displacement DISPA-B, the functionality of the "back" action may be enabled so as to return to a previous state (e.g., the state of FIG. 4). In various implementations, such operations may effectively set a new MTE position, which may correspond to the current position of the jaw 218' when the "back" action is enacted, as will be described in more detail below with respect to FIG. 9.

Figure 6:
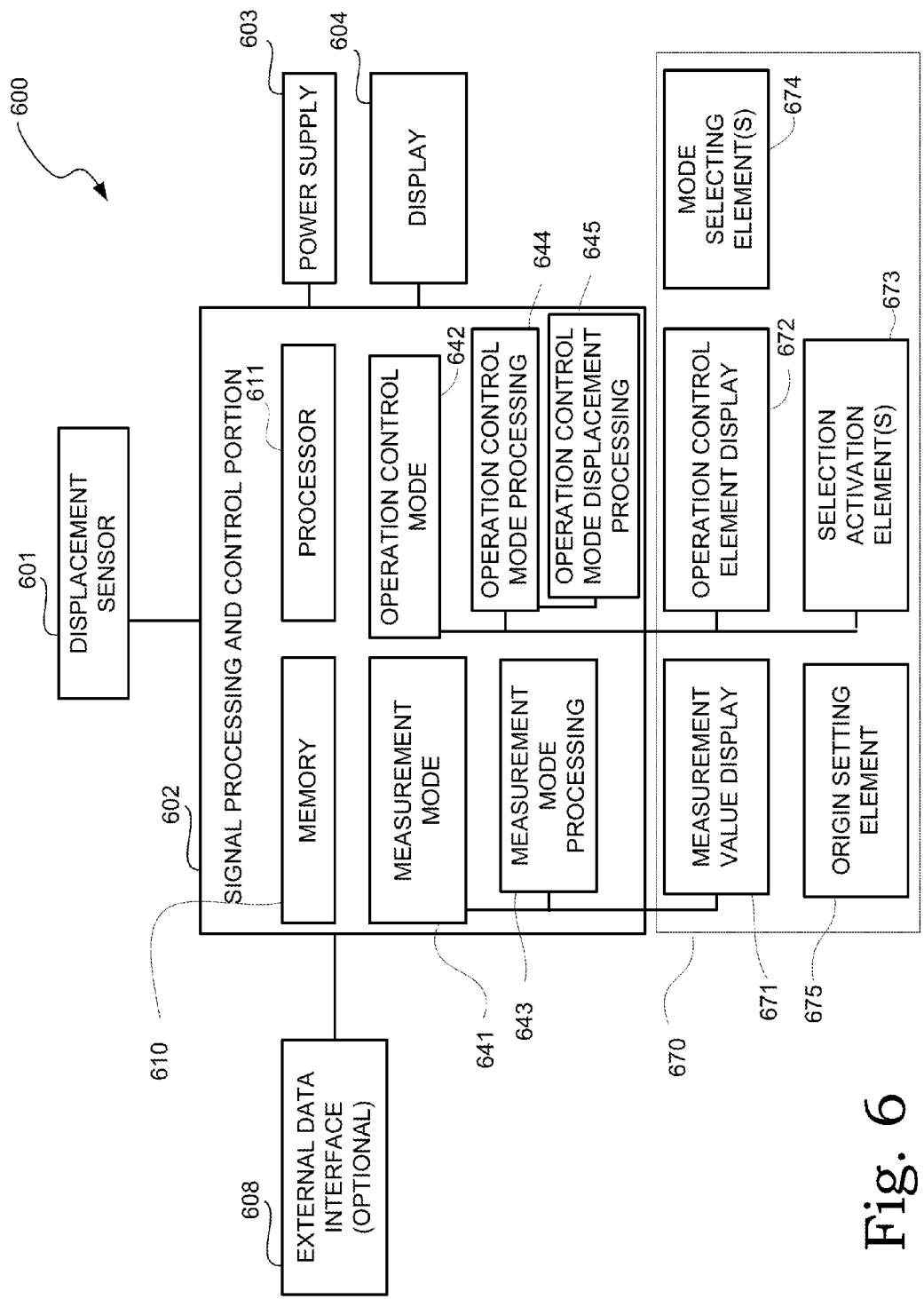
FIG. 6 is a block diagram illustrating various functional elements of a measuring device.

FIG. 6 is a block diagram illustrating various functional elements of a measuring device 600. It will be appreciated that any or all of the functional elements of FIG. 6 may be representative of functional elements of the measuring device described herein (e.g., the measuring devices 200 and 1000). As shown in FIG. 6, the measuring device 600 includes a displacement sensor 601, a signal processing and control portion 602, a power supply 603, a display 604, user interface features 620 and may, optionally, include an external data interface 608 usable to connect the signal processing and control portion 602 to exchange control signals and/or measurement data with an external computer or device (not shown). The signal processing and control portion 602 includes a memory 610, a processor 611, a measurement mode 641 (e.g., corresponding to a first user interface mode), a measurement mode processing portion 643, an operation control mode 642 (e.g., corresponding to a second user interface mode), an operation control mode processing portion 644, and an operation control mode displacement processing portion 645. The user interface features 670 include a measurement value display 671, an operation control element display 672, selection activation elements 673, mode selecting elements 674, and origin setting elements 675.

In various implementations, the displacement sensor 601 may include any convenient type of dimensional measurement transducer, including angular measurement transducers, linear measurement transducers, or the like. When the measuring device 600 is a low-power and portable handheld measurement device, it is advantageous to use a capacitive or inductive transducer such as those described in detail in U.S. Pat. Nos. 4,879,508; 5,023,559; 5,841,274; 5,894,678; 5,973,494; 6,002,250; and 6,011,389, for example, which are incorporated herein by reference in their entirety. Furthermore, in various implementations, the displacement sensor 601 may include an absolute measurement type of transducer, such as those disclosed in U.S. Pat. Nos. 5,841, 274, and 5,886,519, for example, which are incorporated herein by reference in their entirety.

In various implementations, the signal processing and control portion 602 may include the memory 610 and processor 611 for storing and executing various instructions implemented by the signal processing and control portion 602. The memory 610 may be any device capable of storing and writing data for later use, including in some implementations even when no power is supplied to the memory 610. This may include, but is not limited to, a conventional hard drive device, RAM, ROM, any solid-state device, including removable and non-removable devices, etc. The memory 610 is further configured to store computer-readable instructions that may be executed on the processor 611. The computer-readable instructions stored in the memory 610, when executed by the processor 611, implement the various functions as described herein with regard to the signal processing and control portion 602, but are not limited to such functions.

In various implementations, the power supply 603 may comprise a solar cell, a miniature 1.5-volt or 3-volt battery, or the like. The incorporated references include detailed descriptions of the design and operation of various components usable in measuring devices, including components usable for the signal processing and control portion 602 and the power supply 603. In various implementations, the display 604 may be fabricated utilizing various technologies. For example, in one implementation, the display 604 may include an addressable pixel array controlled to form displayed operation control elements (e.g., the operation identifiers 311-315 of FIGS. 3-5). As another example, as will be described in more detail below with respect to FIGS. 10 and 11, an LCD display may be provided including a fixed set of pre-fabricated operation control element patterns that form displayed operation control elements. In general, any now-known or later-developed display types that provide the desired operating characteristics may be used. It will be appreciated that each of these components, as well as the additional components described below, may be interconnected by one or more data/control buses and/or application programming interfaces, or by direct connections between the various elements.

In various implementations, the measurement mode 641 may correspond to a first user interface mode wherein displacement measurement values are displayed and are responsive to changes in the displacement of the displacement sensor (e.g., as described above with respect to FIG. 2). The measurement mode processing portion 643 may receive displacement values from the displacement sensor 601 for being processed and displayed, and may also implement and/or be associated with certain user interface features, as will be described in more detail below with respect to the user interface features 670. In various implementations, the operation control mode 642 may correspond to a second user interface mode wherein operation control elements are displayed in the user interface and an operation control element action visible in the user interface is responsive to changes in the displacement of the displacement sensor (e.g., as described above with respect to FIGS. 3-5, and as will be described in more detail below with respect to FIGS. 7-11). The operation control mode processing portion 644 may be responsible for implementing and navigating various menu functions and operational control of the measuring device, and may also implement and/or be associated with certain user interface features, as will be described in more detail below with respect to the user interface features 670. The operation control mode displacement processing portion 645 may be responsible for monitoring the displacement of the displacement sensor 601 with respect to certain amounts of displacement (e.g., DISPA-B) being used to control various functions (e.g., movement of a selection indicator 330).

The various user interface features 670 may be controlled independently and/or as part of or associated with various components of the signal processing and control portion 602. In various implementations, the measurement value display 671 may be associated with the measurement mode 641, and may provide measurement values on the display (e.g., the displayed measurement value DMV of FIG. 2). In various implementations, the operation control element display 672 may be associated with the operation control mode 642, and may provide the operation control elements on the display (e.g., the operation identifiers 311-315 of FIGS. 3 and 4). The selection activation elements 673 may also be associated with the operation control mode 642, and may enable a selection activation element that is operable by a user to activate operations associated with a selected operation (e.g., the pressing of the button 205 of FIG. 4 so as to activate operations associated with the selected operation identifier 313).

The mode selecting elements 674 may enable elements that are manually operable by a user to switch between the measurement mode 641 and the operation control mode 642 (e.g., the operation of buttons 205 and 206 of FIGS. 2 and 3 for switching between the first and second user interface modes). In various implementations, in addition to the buttons 205 and 206, the selection activation elements 673 and the mode selecting elements 674 may also utilize other types of mechanisms for selection actions (e.g., a shake sensor including an accelerometer, a hover timer for a cursor or pointer or other user-controlled element on the display, etc.) The origin setting elements 675 may enable elements for setting a current displacement sensor position as an origin (e.g., with a value of zero) for a measurement (e.g., as described above with respect to the button action indicator 206b as operated by the button 206 of FIG. 2).

Figure 7:
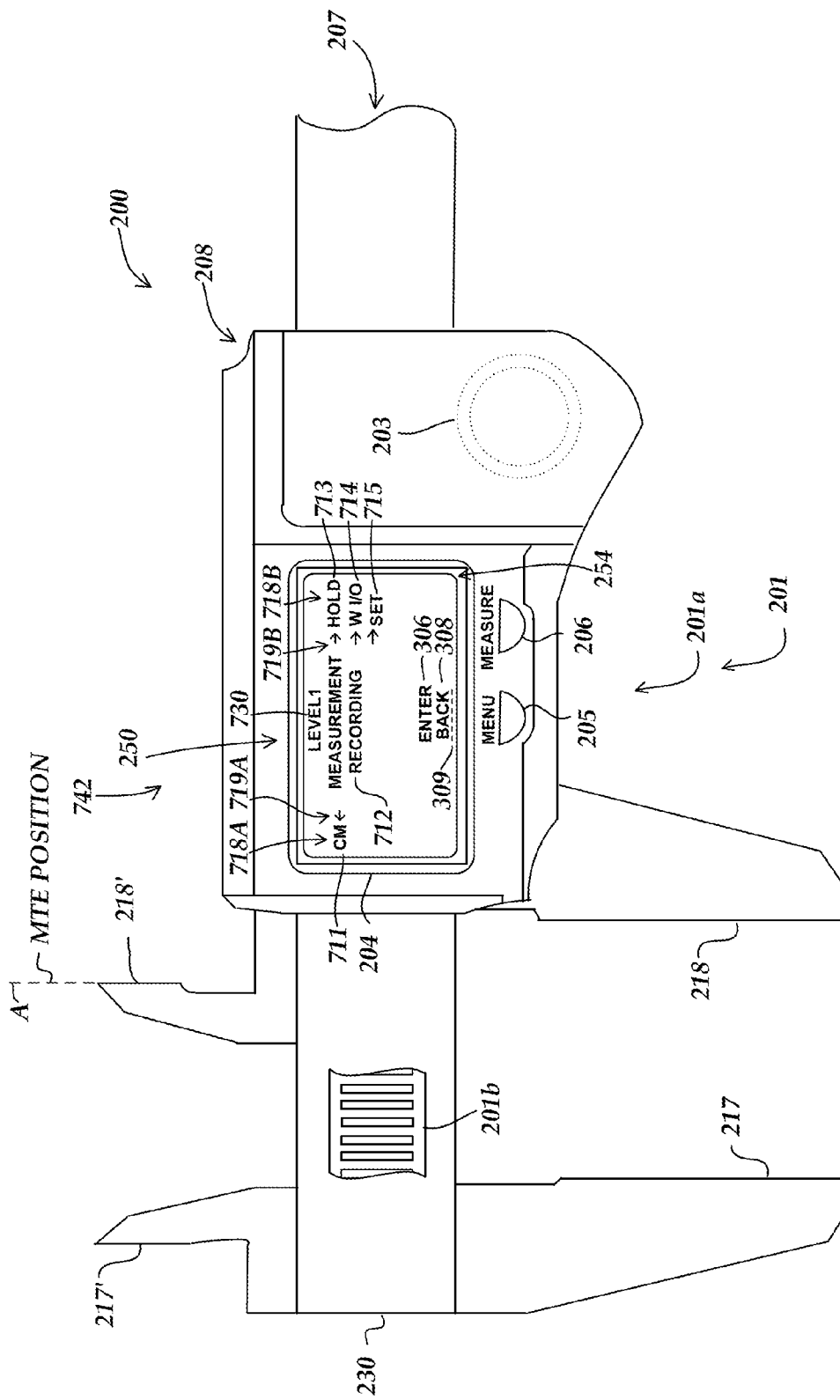
FIG. 7 is a diagram of the measuring device of FIG. 2 in which the display illustrates a second exemplary embodiment of a second user interface mode.

FIG. 7 is a diagram of the handheld measuring device 200 of FIG. 2 in which the display 204 illustrates a second exemplary embodiment of a second user interface mode 742. As shown in FIG. 7, a user interface screen 254 includes a set of operation identifier 711-715, which may be similar to the operation identifiers 311-315 of FIG. 3. In contrast to the implementation of FIG. 3, in FIG. 7 the user interface screen 254 corresponds primarily to the operation identifier 712 which is at a central user interface focus (i.e., in the middle of the user interface screen 254), while the remaining operation identifiers 711 and 713-715, which correspond to different user interface screens, are shown to the sides. As will be described in more detail below with respect to FIG. 8, in this configuration, a displacement of the displacement sensor 201 (e.g., a displacement of the readhead 201a relative to the scale 201b) results in a switching between respective user interface screens which include respective screen configurations (e.g., in which each respective screen configuration corresponds to a different operation identifier 711-715 as a central user interface focus).

With regard to the directional movement of the readhead 201a relative to the scale 201b, the user interface screen 254 includes arrow symbols in directional indicator columns 719A and 719B, which are next to corresponding operation identifier columns 718A and 718B. In one implementation, the operation identifiers included in the left identifier column 718A may generally be switched to through movements of the readhead 201a to the left, as indicated by the arrow symbol in the directional indicator column 719A. As a specific example, the operation identifier 711 is shown in the identifier column 718A, with a left arrow symbol in the directional indicator column 719A, thus indicating that a user interface screen for the operation identifier 711 (e.g., corresponding to "computed measurements") may be switched to through a movement of the readhead 201a to the left by one "display changing increment" (as described above with respect to FIGS. 3 and 4). In contrast, the column 718B to the right includes the operation identifiers 713-715, with the corresponding arrow indicators in the directional indicator column 719B indicating that user interface screens for each of the operation identifiers 713-715 may be switched to through movements of the readhead 201a to the right. In particular, respective user interface screens corresponding to each of the operation identifiers 713-715 may be switched to in sequence, moving through the list in the column 718B from top to bottom, through respective movements of the readhead 201a to the right by respective display changing increments, as will be described in more detail below with respect to FIG. 8. As shown in FIG. 7, the respective screen configuration of the respective user interface screen 254 also includes a level indicator 730, which indicates that the current user interface screen 254 is at a "Level 1" for the operation identifier 712 (i.e., corresponding to "measurement recording").

Figure 8:
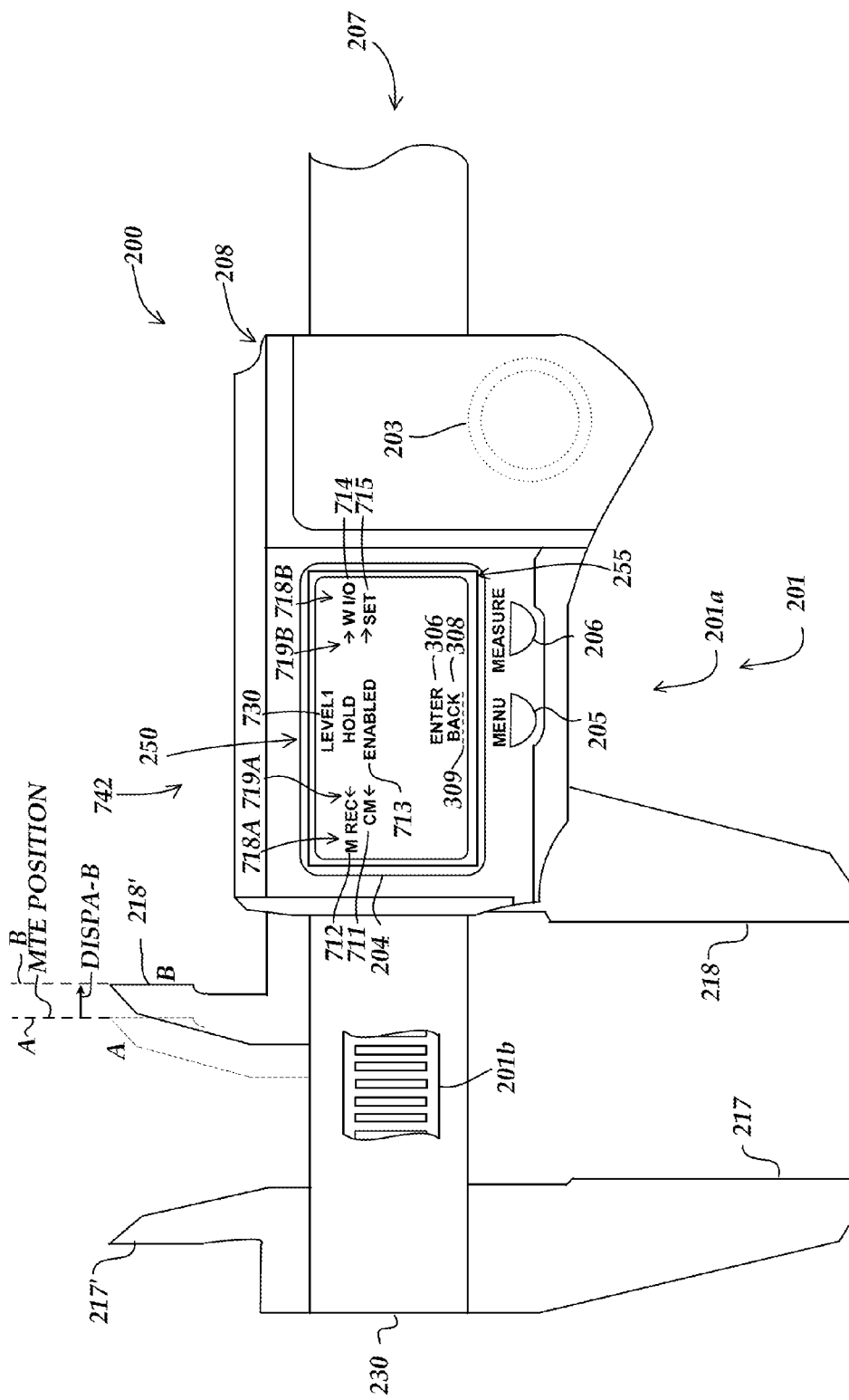
FIG. 8 is a diagram of the measuring device of FIG. 7 in which the display illustrates a subsequent scrolling to a next user interface screen for a next operation identifier in response to a movement of the displacement sensor.

FIG. 8 is a diagram of the handheld measuring device 200 of FIG. 7 in which a subsequent movement of the readhead 201a has resulted in a scrolling to a user interface screen 255, corresponding to the operation identifier 713. It will be appreciated that in comparison to the second user interface mode 242 of FIG. 3 where the operation identifiers 311-315 were presented in an operation selection menu (e.g., organized in a type of "tree view"), in the second user interface mode 742 of FIGS. 7 and 8, an entire user interface screen scrolls right/left to a next respective user interface screen corresponding to a respective operation identifier 711-715. More specifically, as shown in FIG. 8, the readhead 201a is illustrated as having been moved to the right as indicated by a displacement DISPA-B, corresponding to the movement of the jaw 218' from the MTE position at the position A to a position B. In the respective screen configuration of the user interface screen 255, the operation identifier 713 (i.e., corresponding to a "hold enabled" operation) is at a central user interface focus. The operation identifiers 711 and 712 are shown in the left operation identifier column 718A (i.e., indicating that corresponding respective user interface screens for each of the operation identifiers may be switched to through respective display changing increment movements of the readhead 201a to the left), while the operation identifiers 714 and 715 are shown in the right hand operation identifier column 718B (i.e., indicating that corresponding respective user interface screens for each of the operation identifiers may be switched to through respective display changing increment movements of the readhead 201a to the right). With respect to the operation identifier 713 (i.e., corresponding to a "hold enabled" operation), a user may press the button 205 as a selection action (i.e., corresponding to the button action indicator 306), which in one implementation may cause a switch to the user interface screen 253 of FIG. 5 (i.e., similar to the operations for switching from the user interface screen 252 of FIG. 4 to the user interface screen 253 of FIG. 5, as described above).

Figure 9:
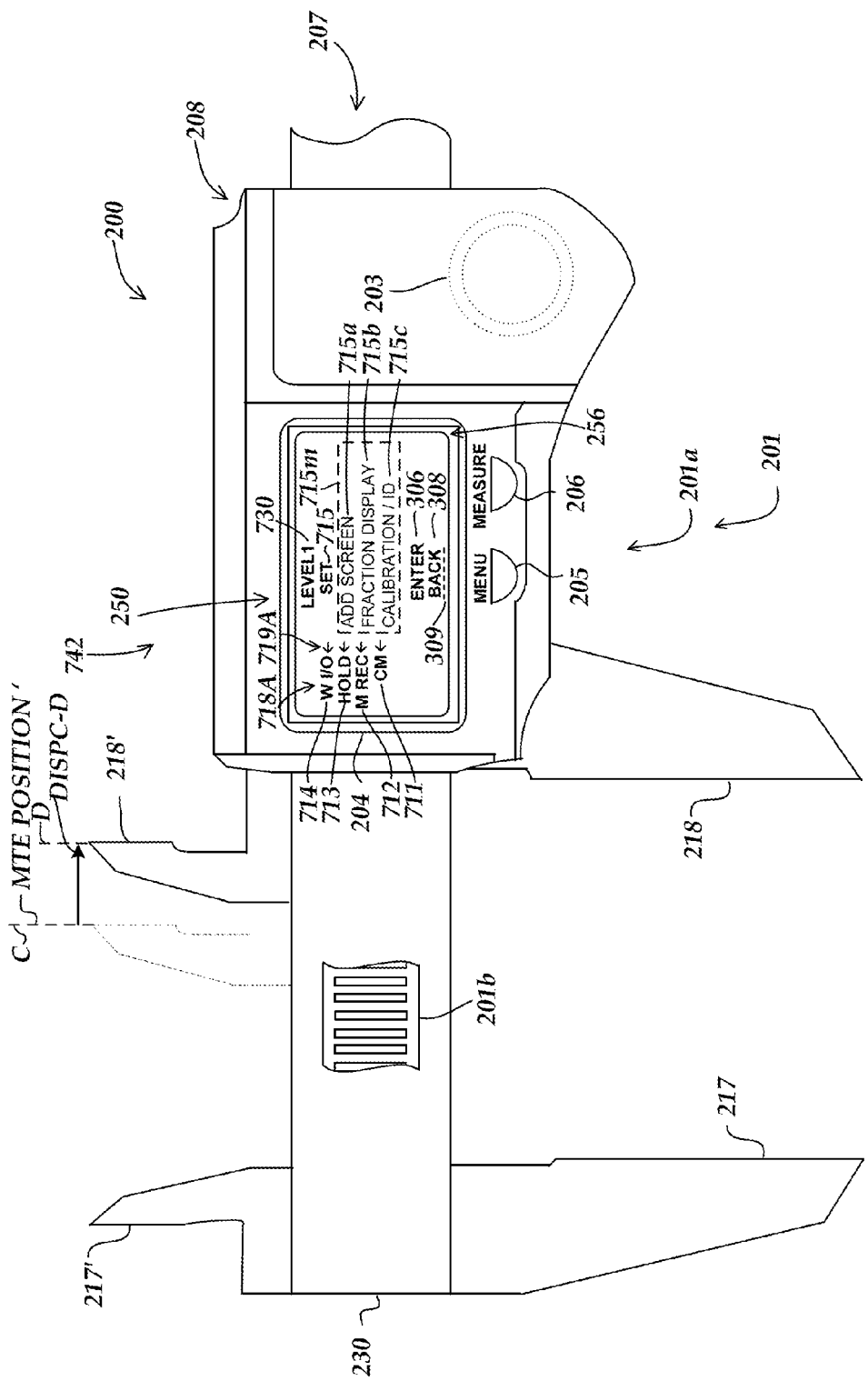
FIG. 9 is a diagram of the measuring device of FIG. 8 in which the display illustrates a subsequent scrolling to a next user interface screen for a next operation identifier in response to a series of subsequent operations including a movement of the displacement sensor.

FIG. 9 is a diagram of the measuring device of FIG. 8 in which subsequent operations including a movement of the readhead 201a has resulted in a scrolling to a user interface screen 256 corresponding to operation identifier 715 for which an additional operation menu 715m is illustrated. In the example of FIG. 9, the current state including the position of the readhead 201a has been reached from the state of FIG. 8 through a number of steps. More specifically, the user interface screen 253 of FIG. 5 was initially reached from the state of FIG. 8 by a user pressing the button 205 (i.e., corresponding to the button action indicator 306 for performing an "enter" function). While in the state of FIG. 5, the user subsequently utilized the "hold enabled" mode, and moved the readhead 201a such that the jaw 218' was moved to a position C. From the state of FIG. 5, the user then performed an extended press of the button 205 (i.e., corresponding to the button action indicator 308 for executing a "back" function). This sequence of operations resulted in the new MTE position (MTE POSITION') being set as corresponding to the position C for the jaw 218'. In other words, in this particular implementation, when a "back" function is executed (i.e., corresponding to the button action indicator 308), a new MTE position (e.g., position C in FIG. 9) may be set according to the current location of the readhead 201a. In this manner, a user may utilize the "back" function to return to a previous user interface screen, regardless of the current position of the readhead 201a. As a related aspect, in various implementations, the second user interface mode may be configured such that a first respective user interface screen (e.g., user interface screen 254) that appears when switching from the first to the second user interface mode, and the behavior of that first respective user interface screen in response to subsequent changes in the displacement of the displacement sensor, may be independent of the position of the displacement sensor 201 when switching from the first to the second user interface mode, for at least a majority of positions in a measurement range of the displacement sensor 201.

With respect to FIG. 9, a subsequent movement of the readhead 201a corresponding to a movement of the jaw 218' from the position C to the position D results in a corresponding scrolling to the user interface screen 256 for which the central user interface focus is the operation identifier 715 (i.e., corresponding to a "settings" operation). More specifically, as shown in FIG. 9, the readhead 201a is illustrated as having been moved to the right as indicated by a displacement DISPC-D, corresponding to the movement of the jaw 218' from the MTE position (MTE POSITION') at the position C to a position D. As shown in FIG. 9, in one implementation, the operation menu 715m may foreshadow the subordinate operation identifiers 715a-715c that will be available if the operation identifier 715 is activated by a user pressing the button 205 (i.e., corresponding to the button action indicator 306 for an "enter" action). More specifically, the subordinate operation identifier 715a corresponds to an "add screen" operation, while the subordinate operation identifier 715b corresponds to a "fraction display" operation, and the subordinate operation identifier 715c corresponds to a "calibration/ID" operation.

In the user interface screen 256, the operation identifiers 711-714 are shown to be in the left hand operation identifier column 718A, for which the arrow indicators in the directional indicator column 719A indicate that the respective user interface screens for each of the operation identifiers may be scrolled to through respective display changing increment movements of the readhead 201a to the left. In one implementation, once the operation identifier 715 is activated, the subordinate operation identifiers 715a-715c may also subsequently be scrolled through in response to changes in the displacement of the displacement sensor 201. More generally, activated operations that are associated with a respective displayed user interface screen may include causing subsequent changes in the displacement of the displacement sensor to affect operation control element actions directed to subordinate operation control elements which are organized in a functional hierarchy under the currently displayed respective user interface screen.

Figure 10:
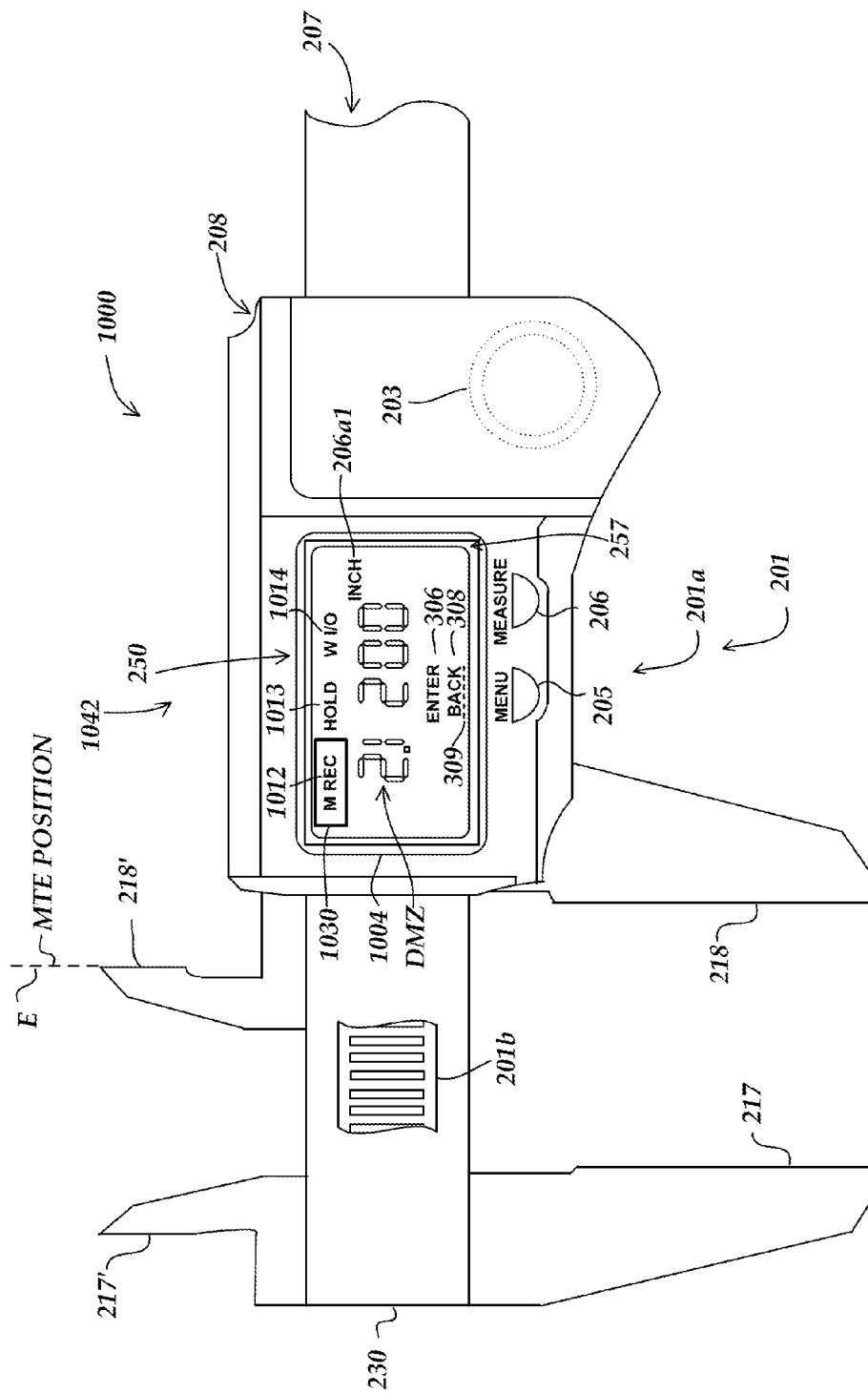
FIG. 10 is a diagram of a measuring device with a display which illustrates a third exemplary embodiment of a second user interface mode.

FIG. 10 is a diagram of a handheld measuring device 1000 with a display 1004 which illustrates a third exemplary embodiment of a second user interface mode 1042. It will be appreciated that certain components of the measuring device 1000 may be similar to those of the measuring device 200 of FIG. 2, and will be understood to operate similarly, except as otherwise described below. In the example of FIG. 10, the display 1004 may include a custom liquid crystal display (LCD) comprising a fixed set of pre-fabricated operation control element patterns that form a set of displayed operation control elements (e.g., operation identifiers) 1012-1014 in a user interface screen 257. In various implementations, other display elements (e.g., button action indicators 306 and 308) may also be formed from pre-fabricated patterns. In one implementation, the display 1004 may be of a type that is not touch sensitive. In various implementations, each alphanumeric digit displayed as part of a displayed measurement value DMV may comprise at least seven line segments, not all of which are shown for each digit in FIG. 10. Also, more than one usable decimal point location may be provided. In various implementations, the displayed measurement value DMV may be displayed during both the first and second user interface modes.

Similar to the operation identifiers 312-314 described above with respect to FIG. 3, during the second user interface mode 1042 the operation identifier 1012 may correspond to a "measurement recording" operation, while the operation identifier 1013 may correspond to a "hold enabled" operation, and the operation identifier 1014 may correspond to a "wireless input/output" operation. As illustrated in FIG. 10, once a user presses the button 205 for switching from the first user interface mode (i.e., for performing measurements) to the second user interface mode (e.g., for operation control), the selection indicator 1030 may be displayed for indicating one of the operation identifiers 1012-1014. It will be noted that at the start of the second user interface mode the jaw 218' is shown to be at a position E, which corresponds to an MTE position for the readhead 201a. In the example of FIG. 10, the selection indicator 1030 is shown as starting at a position for indicating the operation identifier 1012. In various implementations, additional operation identifiers (e.g., corresponding to operation identifiers 311 and 315) may also be included, although for purposes of simplifying the illustration of FIG. 10, only the operation identifiers 1012-1014 are included.

Figure 11:
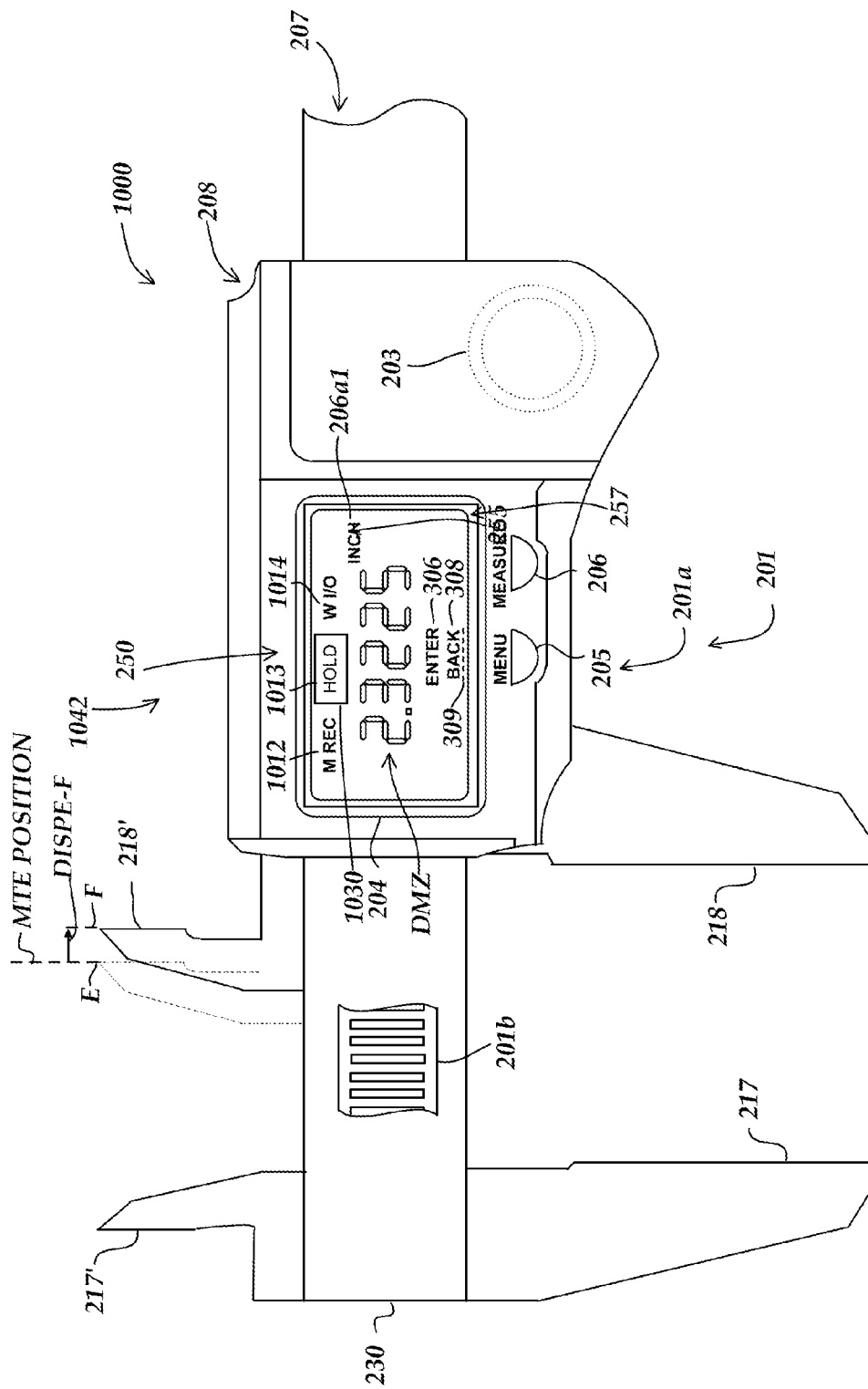
FIG. 11 is a diagram of the measuring device of FIG. 10 in which the display illustrates a subsequent movement of a selection indicator to a next operation identifier in response to a movement of the displacement sensor.

FIG. 11 is a diagram of the handheld measuring device of FIG. 10 in which a subsequent movement of the readhead 201a has resulted in a movement of the selection indicator 1030 to a subsequent operation identifier 1013. As illustrated in FIG. 11, the readhead 201a has been moved by a distance corresponding to a displacement DISPE-F, which is illustrated for a movement of the jaw 218' from the initial position E (i.e., corresponding to the MTE position) to a position F. This displacement of the displacement sensor 201 (i.e., for the movement of the readhead 201a relative to the scale 201b) is sensed by the signal processing and control portion (e.g., as illustrated in FIG. 6) which causes a subsequent movement of the selection indicator 1030 to indicate the operation identifier 1013 (i.e., corresponding to the "hold" operation).

In the example of FIG. 11, the displayed measurement value DMV (i.e., with an indicated value of 2.3225) is shown to have changed from the displayed measurement value DMV of FIG. 10 (i.e., with an indicated value of 2.1200 inches), as corresponding to the movement of the readhead 201a and associated jaw 218' from the position E to the position F. In other words, in one implementation, the displayed measurement value DMV may remain active during the second user interface mode, although it may not otherwise affect the second user interface mode for which the movement of the readhead 201a is utilized to move the selection indicator 1030 for selecting a corresponding operation identifier, as described above. Similar to the operations described above, when an operation control element (e.g., one of the operation identifiers 1012-1014) is indicated by the selection indicator 1030, the user may press the button 205 (e.g., as corresponding to the button action indicator 306), as a selection activation element for activating operations associated with the selected operation control element. For each of the operation identifiers 1012-1014, the corresponding sub-modes that may be activated by the selection activation element may be similar to those described above with respect to FIGS. 3-9, although in certain implementations may be relatively simplified in terms of the corresponding elements in the user interface due to the more limited spatial availability for fixed icons within the LCD display 1004.

While preferred embodiments of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various embodiments described above can be combined to provide further embodiments. All of the U.S. patents and U.S. patent applications referred to in this specification are incorporated herein by reference, in their entirety. Aspects of the embodiments can be modified, if necessary to employ concepts of the various patents and applications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A measuring device, comprising:
   a displacement sensor comprising a readhead and a scale displaceable relative to one another along a measuring axis under manual control of a user;
   a display connected to the readhead;
   a signal processing and control portion connected to the displacement sensor and the display; and
   a user interface controlled by the signal processing and control portion and displayed on the display, including user interface features comprising displacement measurement values and operation control elements displayed on the display,
   wherein:
   the user interface comprises:
   a first user interface mode wherein the displacement measurement values are displayed and are responsive to changes in displacement of the displacement sensor, and
   a second user interface mode wherein the operation control elements are displayed in the user interface and an operation control element action visible in the user interface is responsive to changes in the displacement of the displacement sensor, the operation control element action comprising a selection action which selects an operation control element, the selection action comprising at least one of:
   a) selecting, or switching between, respective user interface screens which include respective screen configurations, including switching or scrolling between respective user interface screens in the display automatically in response to a change in the displacement of the displacement sensor, wherein the user interface further comprises at least a first selection activation element operable by the user to activate operations associated with the operation control element selected by the selection action, and the user interface is configured such that when the first selection activation element is operated by the user it activates operations associated with a currently displayed respective user interface screen including operations which cause subsequent changes in the displacement of the displacement sensor to affect operation control element actions directed to subordinate operation control elements which are organized in a functional hierarchy under the currently displayed respective user interface screen; or
   b) moving a selection indicator between operation identifiers within an operation selection menu in response to a change in the displacement of the displacement sensor and selecting an operation identifier in the operation selection menu.

2. The measuring device of claim 1, wherein the operation control elements comprise at least one of:
   a) a respective user interface screen which includes a respective screen configuration;
   b) a plurality of operation identifiers in an operation selection menu; or
   c) a plurality of item identifiers in an item selection menu.

3. The measuring device of claim 1, wherein the selection action comprises the selection action b), and the measuring device is a handheld caliper and moving the selection indicator comprises moving it from a first operation identifier to a second operation identifier in response to a change in the displacement of the displacement sensor which is not less than 0.5 mm.

4. The measuring device of claim 3, wherein moving the selection indicator comprises moving from the first operation identifier to the second operation identifier in response to a change in the displacement of the displacement sensor which is at most 5 mm.

5. The measuring device of claim 1, wherein the selection action comprises the selection action b), and the measuring device is a handheld micrometer actuated by a rotating thimble, and moving the selection indicator comprises moving it from a first operation identifier to a second operation identifier in response to a change in the displacement of the displacement sensor which corresponds to a thimble rotation which is not less than 10 degrees and which is at most 100 degrees.

6. The measuring device of claim 1, wherein the selection action comprises the selection action a), and the selection activation element comprises a first button manually operable by a user to activate operations associated with the operation control element selected by the selection action.

7. A measuring device, comprising:
   a displacement sensor comprising a readhead and a scale displaceable relative to one another along a measuring axis under manual control of a user;
   a display connected to the readhead;
   a signal processing and control portion connected to the displacement sensor and the display; and
   a user interface controlled by the signal processing and control portion and displayed on the display, including user interface features comprising displacement measurement values and operation control elements displayed on the display,
   wherein:
   the user interface comprises:

a first user interface mode wherein the displacement measurement values are displayed and are responsive to changes in displacement of the displacement sensor, and a second user interface mode wherein the operation control elements are displayed in the user interface and an operation control element action visible in the user interface is responsive to changes in the displacement of the displacement sensor, wherein the second user interface mode is configured such that a first respective user interface screen that appears when switching from the first to the second user interface mode, and the behavior of that first respective user interface in response to subsequent changes in the displacement of the displacement sensor, are independent of the position of the displacement sensor when switching from the first to the second user interface mode, for at least a majority of positions in a measurement range of the displacement sensor.

8. The measuring device of claim 7, wherein the user interface comprises a first button that is manually operable by the user to switch to the second user interface mode when the measuring device is in the first user interface mode.

9. The measuring device of claim 8, wherein when the measuring device is in the second user interface mode the first button is manually operable by a user to activate operations associated with a currently selected operation control element indicated by a selection indicator in the user interface.

10. The measuring device of claim 8, wherein the user interface comprises a second button that is manually operable by a user to switch to the first user interface mode when the measuring device is in the second user interface mode.

11. A measuring device, comprising:
a displacement sensor comprising a readhead and a scale displaceable relative to one another along a measuring axis under manual control of a user;
a display connected to the readhead;
a signal processing and control portion connected to the displacement sensor and the display; and
a user interface controlled by the signal processing and control portion and displayed on the display, including user interface features comprising displacement measurement values and operation control elements displayed on the display,
wherein:
the user interface comprises:
a first user interface mode wherein the displacement measurement values are displayed and are responsive to changes in displacement of the displacement sensor, and
a second user interface mode wherein the operation control elements are displayed in the user interface and an operation control element action visible in the user interface is responsive to changes in the displacement of the displacement sensor, wherein the operation control element action visible in the user interface that is responsive to changes in the displacement of the displacement sensor comprises a user interface navigation action that moves a user interface focus between a plurality operation control elements included in the user interface.

12. The measuring device of claim 11, wherein the second user interface mode comprises at least one particular operation control element action visible in the user interface that is triggered by or responsive to a predetermined particular speed, displacement distance, displacement end position, or pattern of positive and negative displacements indicated by the changes in the displacement of the displacement sensor.

13. The measuring device of claim 11, wherein the display is not a touch sensitive type of display.

14. The measuring device of claim 11, wherein the display comprises one of a display comprising an addressable pixel array controlled to form the displayed operation control elements, or an LCD display comprising a fixed set of pre-fabricated operation control element patterns that form the displayed operation control elements.

15. The measuring device of claim 11, wherein the operation control elements comprise user interface features associated with a plurality of the following operations:
   a) operations that store a plurality of measurement values in the measuring device;
   b) operations that include recalling or displaying a plurality of measurement values stored in the measuring device;
   c) operations that include displaying in the user interface a result of a calculation defined by an operation control element and that is determined based on a current measurement value;
   d) operations that include activating wireless data transmission or reception for the measuring device; or
   e) operations that include altering default settings that govern operation of the measuring device.

16. The measuring device of claim 11, wherein the measuring device is one of a handheld caliper or a handheld micrometer.

17. The measuring device of claim 11, wherein the operation control elements comprise at least one of:
   a) a respective user interface screen which includes a respective screen configuration;
   b) a plurality of operation identifiers in an operation selection menu; or
   c) a plurality of item identifiers in an item selection menu.

18. The measuring device of claim 11, wherein the user interface navigation action comprises a selection action which selects an operation control element, the selection action comprising one of:
   a) selecting, or switching between, respective user interface screens which include respective screen configurations;
   b) selecting an operation identifier in an operation selection menu; or
   c) selecting an item identifier in an item selection menu.

19. The measuring device of claim 11, wherein the user interface comprises a first button that is manually operable by the user to switch to the second user interface mode when the measuring device is in the first user interface mode.

20. The measuring device of claim 19, wherein when the measuring device is in the second user interface mode the first button is manually operable by a user to activate operations associated with a currently selected operation control element indicated by a selection indicator that corresponds to the user interface focus in the user interface.

* * * * *